US011305567B2

(12) United States Patent
Fernandez Llorens et al.

(10) Patent No.: US 11,305,567 B2
(45) Date of Patent: Apr. 19, 2022

(54) HARDWARE DETECTION (71) Applicant: HEWLETT-PACKARD DEVELOPMENT COMPANY, L.P., Spring, TX (US)

(72) Inventors: Lorena Fernandez Llorens, Sant Cugat del Valles (ES); Roque Bonilla Lucas, Sant Cugat del Valles (ES); Pau Serra, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 24 days.

(21) Appl. No.: 16/622,447

(22) PCT Filed: Jul. 20, 2017

(86) PCT No.: PCT/US2017/043139
§ 371 (c)(1),
(2) Date: Dec. 13, 2019

(87) PCT Pub. No.: WO2019/017958
PCT Pub. Date: Jan. 24, 2019

(65) Prior Publication Data
US 2020/0101779 A1 Apr. 2, 2020

(51) Int. Cl.
B41J 29/393 (2006.01)
B41J 2/175 (2006.01)

(52) U.S. Cl.
CPC ......... B41J 29/393 (2013.01); B41J 2/17546 (2013.01)

(58) Field of Classification Search
CPC ...... G06F 21/86; G06F 21/44; B41J 2/17503; B65H 29/46; B65H 43/04
See application file for complete search history.

(56) References Cited

U.S. PATENT DOCUMENTS

| | | | |
|---|---|---|---|
| 5,578,991 A | 11/1996 | Scholder | |
| 5,677,850 A | 10/1997 | Reinhold | |
| 5,828,389 A | 10/1998 | Yamaguchi | |
| 5,991,158 A | 11/1999 | Chan et al. | |
| 6,324,351 B1 | 11/2001 | Kurimoto | |
| 6,388,758 B2 | 5/2002 | Kawanabe | |
| 7,033,009 B2 | 4/2006 | Shinada | |
| 8,559,830 B2 | 10/2013 | Wayman | |
| 2003/0011654 A1* | 1/2003 | Asauchi | B41J 2/17503 347/19 |
| 2009/0140869 A1 | 6/2009 | Crockett | |

(Continued)

FOREIGN PATENT DOCUMENTS

| | | |
|---|---|---|
| CN | 201425902 | 3/2010 |
| CN | 201886579 | 6/2011 |
| CN | 103398728 | 11/2013 |

(Continued)

Primary Examiner — Lam S Nguyen
(74) Attorney, Agent, or Firm — HP Inc. Patent Department (57) ABSTRACT A hardware detection system according to one example includes a moveable contact body to contact a hardware item to be detected; an switching unit operatively coupled to the contact body; a reset device operatively coupled to the switching unit; and a control unit to receive a signal from the switching unit in response to a movement of the contact body and to issue a signal to the reset device in response to the signal from the switching unit.

20 Claims, 9 Drawing Sheets (56) References Cited

U.S. PATENT DOCUMENTS

2016/0004886 A1   1/2016  Sedon
2017/0147839 A1   5/2017  Peana

FOREIGN PATENT DOCUMENTS

| CN | 203444486 | 2/2014 |
| CN | 105448013 | 3/2016 |
| CN | 105900107 | 8/2016 |
| JP | 2005138498 A | 6/2005 |
| JP | 2016212683 | 12/2016 |

* cited by examiner

HARDWARE DETECTION

BACKGROUND

In electromechanical equipment, hardware items can be manipulated or replaced. For example, in a printer, a motor, a cover, a power supply unit, different types of rollers etc. can be replaced during servicing. Maintaining an up-to-date record of the hardware items present in electromechanical equipment may be useful for servicing and error tracking. Some hardware items do not carry a serial number and manual documentation about manipulation or replacement may not always be reliable. Automatic detection of part replacement may be helpful.

BRIEF DESCRIPTION OF THE DRAWINGS

The following detailed description references the drawings, wherein.

DETAILED DESCRIPTION

The following detailed description refers to the accompanying drawings. Wherever expedient, the same reference numbers are used in the drawings and the following description to refer to the same or similar parts. For the sake of clarity, some reference numbers omitted in some of the drawings. Whereas several examples are described in this document, modifications, adaptations, and other implementations are possible.

Various examples of the hardware detection system and method of detecting hardware replacement described in this document may be useful in many different types of electromechanical equipment, such as equipment used in the printing industry, automotive industry, production and manufacturing industry or another industrial and technological environment which uses electromechanical systems where it is desired to reliably detect the removal and replacement of a hardware item. In the printing industry, for example, it may be desired to detect replacement of hardware items, such as a motor, a cover, a power supply unit, different types of rollers etc. This goes beyond detecting replacement of consumables and also pertains to the replacement of other hardware items during maintenance, servicing, or repair. In the automotive industry, for example, it may be desired to detect replacement of automotive parts, such as a battery, a wheel, a variety of motor components, etc., or parts of manufacturing equipment, such as parts of a handling device, machining device, tooling device etc. The possibilities of using different examples of the hardware detection system and method of detecting hardware replacement are abundant and comprise virtually any electromechanical system in which the replacement of a hardware item shall be detected.

Examples disclosed in this document can keep track of hardware manipulation and replacement in electromechanical equipment in a way which is human independent, which can work off-line and powerless and which is difficult to manipulate.

An example of a hardware detection system is described with reference to FIG. 1 to 5. In the drawings, the hardware detection system 10 is schematically shown in combination with a hardware item HW which is part of an electromechanical equipment or system. The hardware detection system 10 of this example comprises a movable contact body 12, a switching unit 14, a chassis 16, and a contact body biasing device 18, in the following also referred to as biasing device or spring 18, without implying any limitation to the specific example shown. The chassis 16 may be housing a control unit 16', schematically shown only in FIG. 1, or a control unit may be incorporated in the electromechanical equipment which is being monitored or maybe distributed between the hardware detection system 10 and the electromechanical equipment.

Figure 1:
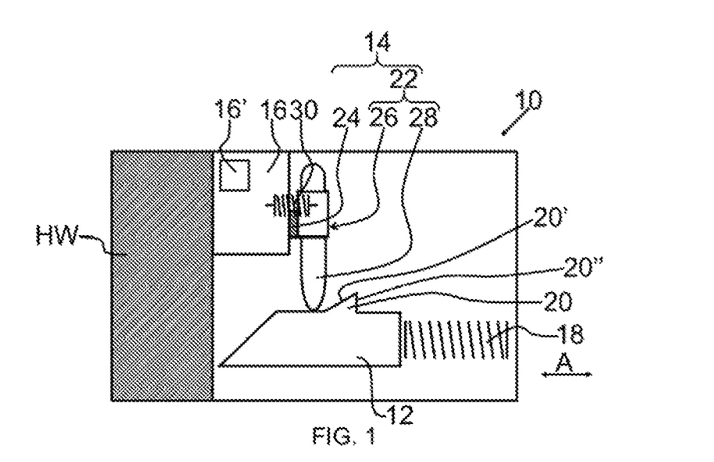
FIG. 1 to 5 show schematic diagrams of a series of states of a hardware detection system according to one example.

In the example, the movable contact body 12 is a latch type element which is movable towards and away from the hardware item HW, as illustrated by arrow A in FIG. 1. The movable contact body 12 is coupled with the biasing device 18 which applies a force onto the contact body 12 to push the contact body towards and in contact with the hardware item HW, if present, or, if the hardware item HW is not present, to push the contact body from the first position, shown in FIG. 1, into a second position, shown in FIG. 2. The biasing device 18 may comprise a spring, such as a coil spring. The movable contact body 12 may comprise a ramp section 20 having a slanted guide surface 20' and a shoulder 20" which are described in further detail below. For the sake of clarity, some reference numbers, such as 20, 20', and 20" are omitted in other drawings.

Figure 3:
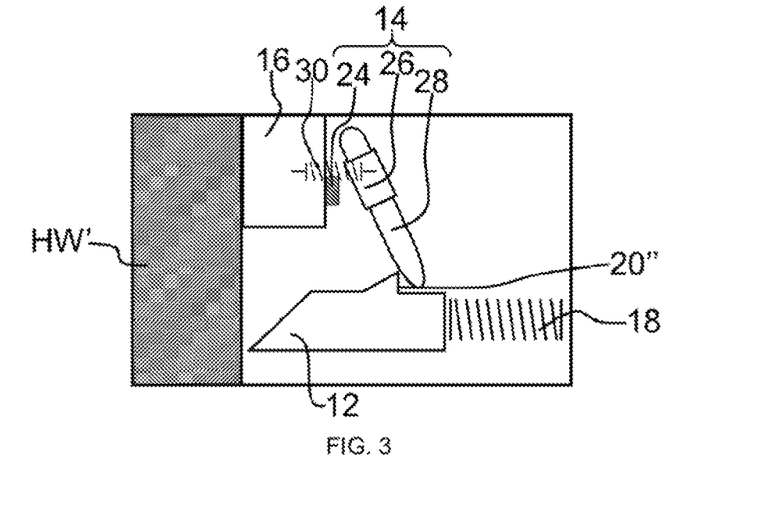
Figure 4:
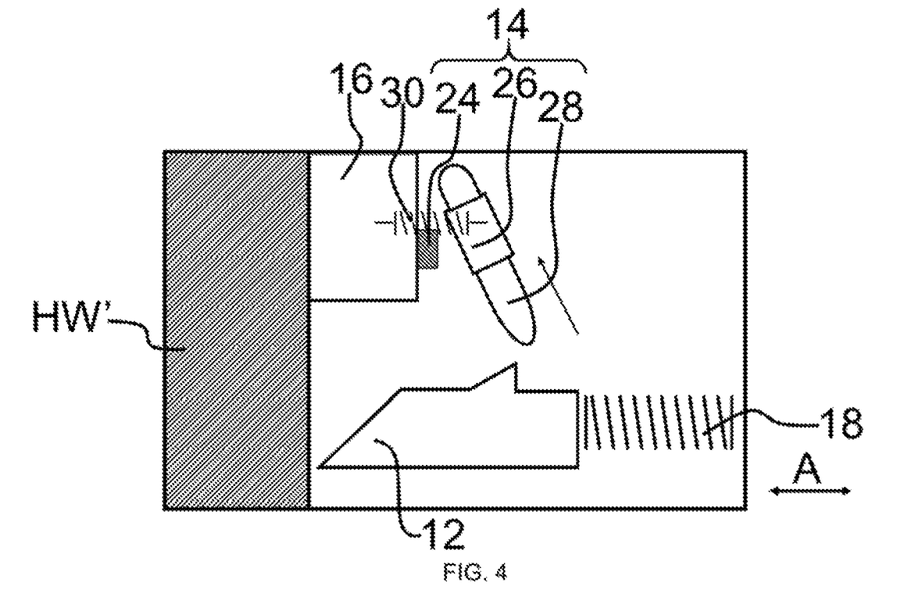

In the example, the switching unit 14 may comprise a switch operating device 22 and a switch 24 which is best seen in FIGS. 3 and 4. For the sake of clarity, reference number 24 is omitted in other drawings. The switch operating device 22 may comprise a solenoid housing 26, pivotably coupled to the chassis 16. A solenoid (not shown) is accommodated within housing 26. Further, the switch operating device 22 may comprise a guide pin 28 which is supported and guided within the solenoid housing 26 to be movable relative to the solenoid housing 26 in a direction which is perpendicular or about perpendicular to the movement direction A of the contact body 12 when the guide pin 28 is in a position that is perpendicular or about perpendicular to the movement direction A, as shown in FIG. 1.

The switch operating device 22 is coupled with the chassis 16 by a further biasing device 30 forcing the switch operating device 22 towards the switch 24. The switch 24 may be a mechanical switch, including a push button, which can be placed in an ON state or connected state and an OFF state or open state. The switch 24 may generate an output signal which is input into the control unit 16'. Accordingly, the state of the switch 24 can be detected by the control unit 16'.

The control unit 16' can be a dedicated control unit of the hardware detection system 10 or can be part of the electromechanical equipment monitored. It also can be divided between the hardware detection system and the electromechanical equipment monitored. The control unit may be implemented in at least one of an analog or digital circuit, a logic circuit, a programmable processor, an application specific integrated circuit (ASIC), a programmable logic device (PLD) and/or a field programmable logic device (FPLD) or a combination or part thereof. The control unit may comprise software and/or firmware, including a tangible computer readable storage device or storage disk such as a memory, a digital versatile disk (DVD), a compact disk (CD), a Blu-ray disk, etc. storing the software and/or firmware.

In the following, operation of the example of the hardware detection system 10, shown in FIG. 1 to 5, is described with reference to the drawings. FIG. 1 shows an initial state of the hardware detection system 10, where a hardware item HW of an electromechanical equipment is in place, with the contact body 12 forced by contracted spring 18 towards (in the drawing, to the left) and in contact with the hardware item HW. The respective position of the contact body 12, shown in FIG. 1, can be considered a first or initial position. The hardware item HW blocks the contact body 12 from any further movement to the left.

Also the switch operating device 22 is in its initial position, with the solenoid housing 26 contacting the switch 24 and the guide pin 28 in an extended position to contact the surface of the contact body 12. In the example shown in FIG. 1 to 5, the guide pin 28, when in the initial position, extends vertically or substantially vertically and/or perpendicularly or substantially perpendicularly to the movement direction A of the contact body. The switch operating device 22 is maintained in this position by the further biasing device 30. The solenoid housing 26 applies a pressing force to the switch 24 which hence is switched ON. The switch may be read out to generate a bistable or binary signal, such as YES or "1" when an ON state or closed state is detected and NO or "0" when and OFF state or open state is detected. The definition of the switching states and the bistable signal can be changed, such as ON when the switch is pressed and OFF when the switch is released or vice versa and such as YES or "1" when an ON state is detected and NO or "0" when and OFF state is detected or vice versa. Without being limited to this example, in the following description of the examples, a pressed switch will be considered to be switched ON to generate a YES or "1" signal and a released switch will be considered to be switched OFF to generate a NO or "0" signal. Different signal levels and definitions of switching states are possible and the operation of the hardware detection system can be adapted to such different signal levels and switching state definitions.

If the control unit 16' detects a YES signal, the hardware detection system 10 recognizes that a hardware item HW is present and has not been replaced since a previous detection operation.

Figure 2:
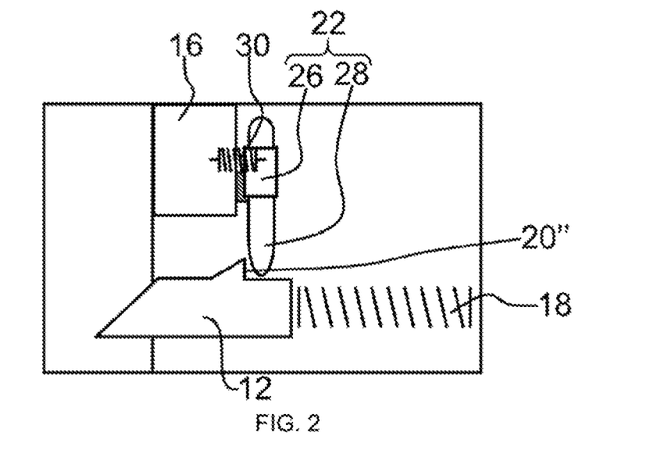

FIG. 2 shows a state in which the hardware item HW has been removed. In this state, the spring 18 has pushed the contact body 12 from its first or initial position (shown in FIG. 1) to a second position where it extends into a space previously occupied by the hardware item HW. As the guide pin 28 of the switch operating device 22 is guided within the solenoid housing 26 to be movable relative to the solenoid housing 26, in a direction which is perpendicular or about perpendicular to the movement direction A of the contact body 12, the guide pin 28 can slide up the ramp section 20 and then snap behind the ramp section 20 and come to rest against the shoulder 20", without deflecting or pivoting the solenoid housing 26. Accordingly, the state of the switch 24 is unchanged and, in the present example, the switch remains switched ON.

FIG. 3 shows a state in which the same or a different hardware item HW' has been (re)inserted. In this state, the contact body 12 is pushed back into its initial or first position by the hardware item HW' against the force of the spring 18, and the spring 18 is compressed. As the guide pin 28 of the switch operating device 22 is trapped behind the shoulder 20" of the ramp section 20, the guide pin 28 follows the movement of the contact body 12, in the drawing from left to right. Accordingly, the guide pin 28 is deflected and causes a pivoting movement of the solenoid housing 26, away from the chassis 16, against the force of the spring 30. As a consequence, the switch 24 is released and is toggled to an OFF state.

In this example, the control unit 16' may be associated with the electromechanical equipment and may be powered down when the electromechanical equipment is turned off and powered up when the electromechanical equipment is turned on. Assuming that the electromechanical equipment and hence the control unit 16' is turned on during the states shown in FIGS. 1, 2, and 3: in the state shown in FIG. 1, the control unit 16' can detect that the switch is turned ON indicating that a hardware item HW is present; and, in the state shown in FIG. 3, the control unit 16' can detect that the switch is turned OFF indicating that a hardware item HW had been removed and a new hardware item HW' has been inserted. Additionally, also in a situation where the electromechanical equipment and hence the control unit 16' is turned on initially, i.e. during the state shown in FIG. 1; then is powered down and turned off for removing and/or replacing the hardware item, as shown in FIG. 2; and, after the new hardware item has been inserted, as shown in FIG. 3, is turned on and powered up again: the control unit 16' can detect that the switch is turned ON indicating that a hardware item HW is present; and, in the state shown in FIG. 3, the control unit 16' can detect that the switch is turned OFF indicating that a hardware item HW had been removed and a new hardware item HW' has been inserted. Accordingly, the control unit 16' can distinguish between a situation where a hardware item is present HW and has not been manipulated since a previous check, and a situation where a hardware item HW had been present, had been removed and a new hardware item HW' has been inserted. This is possible without the use of a memory, because the switch 24 may be an electromechanical switch which may signal an closed or opened state to the control unit 16', corresponding to a situation before and after removal and reinsertion of the hardware item.

Based on the scenario described with regard to FIG. 1 to 3, the control unit 16 could distinguish once between the presence of a previous hardware item HW and the replacement of the previous hardware item HW by a new hardware item HW'. To enable multiple detections of the replacement of hardware items, the control unit 16' can reset the switching unit 14. In the example shown in FIG. 1 to 5, the solenoid (not shown) accommodated within the housing 26 forms a reset device which, when triggered by the control unit 16', causes the guide pin 28 to retract into the solenoid housing 26, as shown in FIG. 4. The guide pin 28 hence comes clear of the shoulder 20" of the ramp section 20, the spring 30 pulls the switch operating device 22 against the chassis 16 and, as a consequence, the switch operating device 22 pushes against switch 24 which hence is switched ON again, indicating that a hardware item, HW or HW', is present.

Figure 5:
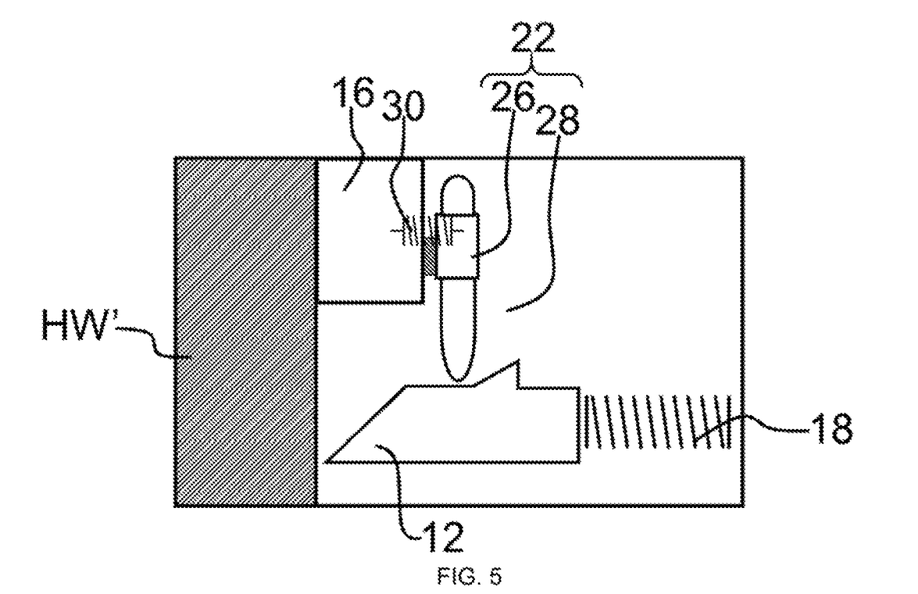

After the reset, the reset device/solenoid is toggled back, releasing the guide pin 28 which hence goes back to its extended position where it comes into contact with the contact body 12, as shown in FIG. 5 which shows the same state as FIG. 1. The hardware detection system is back in its initial position, with a hardware item present, with the switch 24 pushed to indicate an ON state, and the contact body 12 and the switch operating device 22 in their initial positions. The hardware detection system is ready to detect another hardware replacement.

Replacement of hardware items can be detected even if the respective electromechanical equipment is switched off during the replacement and also if the control unit 16' is powerless during the replacement. The hardware detection system can be configured such that resetting of the switching unit is under control of firmware or hardware or a combination thereof. Replacement of a hardware item can be automatically detected and logged and/or reported to a manufacturer or servicing instance. Data concerning the replacement of many different types of hardware items from different electromechanical systems can be used to identify manipulated parts to help identifying e.g. general failures or potential system updates or other changes. The hardware replacement detection system allows an electromechanical equipment to become self-aware of hardware manipulation and can trigger user action. Detection of replacement cannot be manipulated and can be reliably detected even when it occurs during a time where the electromechanical equipment and the control unit are off-line and powerless.

Figure 6:
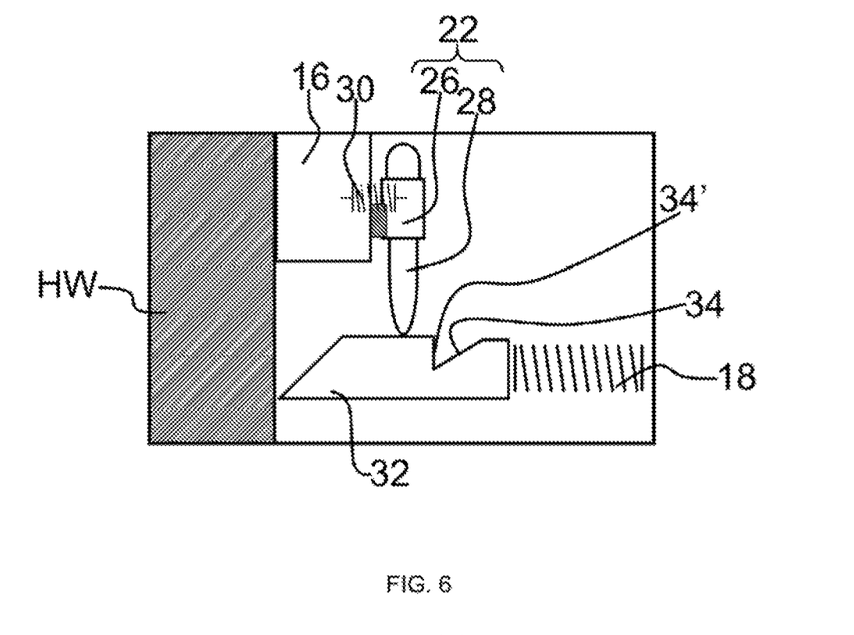
FIGS. 6 and 7 show schematic diagrams of two states of a hardware detection system according to another example.
Figure 7:
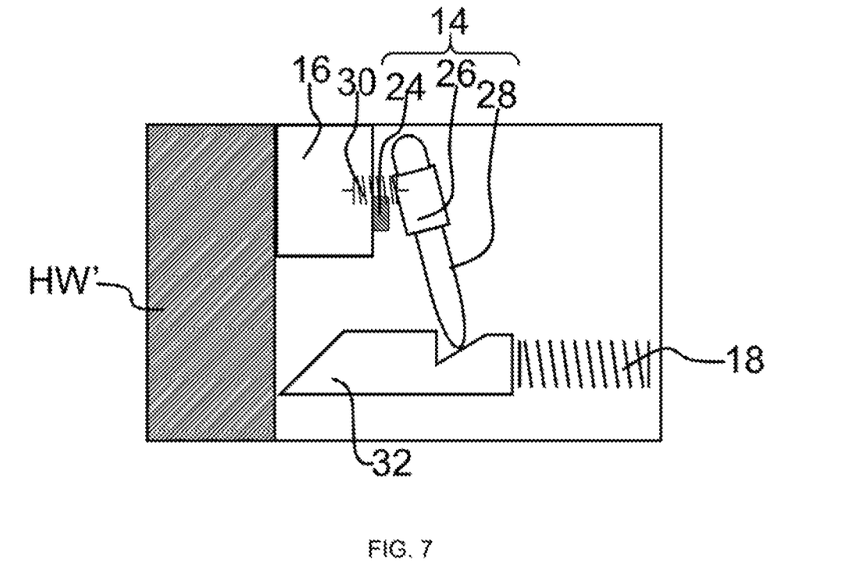

FIGS. 6 and 7 show a modification of the example of FIG. 1 to 5 wherein the same or corresponding parts are designated by the same reference numbers. The states illustrated in FIGS. 6 and 7 correspond to those illustrated in FIGS. 1 and 3. In general, reference is made to the above description of FIG. 1 to 5 which are based on the same operating principles. The modification pertains to the configuration of the contact body 32 which, instead of a ramp section, includes a recess 34, the recess 34 forming a shoulder 34'. FIG. 6 shows an initial state of the hardware detection system, where a hardware item HW is in place, with the contact body 12 forced by contracted spring 18 towards and in contact with the hardware item HW.

Also the switch operating device 22 is in its initial position, with the solenoid housing 26 contacting the switch 24 and, in this example, the guide pin 28 in a retracted position where it rests against the surface of the contact body 12. The switch operating device 22 is maintained in this position by the further biasing device 30. The solenoid housing 26 applies a pressing force to the switch 24 which hence is switched ON.

When the hardware item HW is removed, not shown in the example of FIGS. 6 and 7, the spring 18 pushes the contact body 32 from its first or initial position (shown in FIG. 6) to a second position where it extends into a space previously occupied by the hardware item HW. As the guide pin 28 of the switch operating device 22 slides along the surface of the moving contact body 32 (in the drawing from right to left), it is guided within the solenoid housing 26 to be movable relative to the solenoid housing 26, in a direction which is perpendicular or about perpendicular to the movement direction A of the contact body 32, and the guide pin 28 will drop and extend into the recess 34 and be caught behind the shoulder 34', without deflecting or pivoting the solenoid housing 26. Accordingly, the state of the switch 24 is unchanged and the switch will remain switched ON.

FIG. 7 shows a state in which the same or a different hardware item HW' has been (re)inserted. In this state, the contact body 32 is pushed back into its initial or first position by the hardware item HW', and the spring 18 is compressed. As the guide pin 28 of the switch operating device 22 is trapped behind the shoulder 34' within the recess 34, the guide pin 28 follows the movement of the contact body 12 (in the drawing from left to right). Accordingly, the guide pin 28 is deflected and causes a pivoting movement of the solenoid housing 26, away from the chassis 16, against the force of the spring 30. As a consequence, the switch 24 is released and is toggled to an OFF state.

As in the first example, the control unit 16' may detect the ON and OFF states of the switch 24. Further, as in the previous example, the control unit 16' may reset the switch operating device 22 by causing the guide pin 28 to retract. When the guide pin 28 is caused to retract back into the solenoid housing 22, the switch operating device 14 will be reset to its initial position, as shown in FIG. 6. The spring 30 will pivot the solenoid housing 22 back to rest against the chassis 16 and the switch 24, toggling the switch to its ON state. For further details of the operation, reference is made to the above description of FIG. 1 to 5.

FIG. 8 to 16 illustrate a further example of a hardware detection system 50. In the drawings, the hardware detection system 50 is schematically shown in combination with a hardware item HW which is part of an electromechanical equipment or system. The hardware detection system 50 of this further example comprises a movable contact body 52, a switching unit 54, a chassis, schematically shown at 56, and a contact body biasing device 58, in the following also referred to as biasing device or spring 58, without implying any limitation to the specific example shown. The chassis 56 may be housing or associated with a control unit 60, schematically shown only in FIGS. 8 and 9, or a control unit may be incorporated in the electromechanical equipment which is being monitored or maybe distributed between the hardware detection system 50 and the electromechanical equipment.

Figure 9:
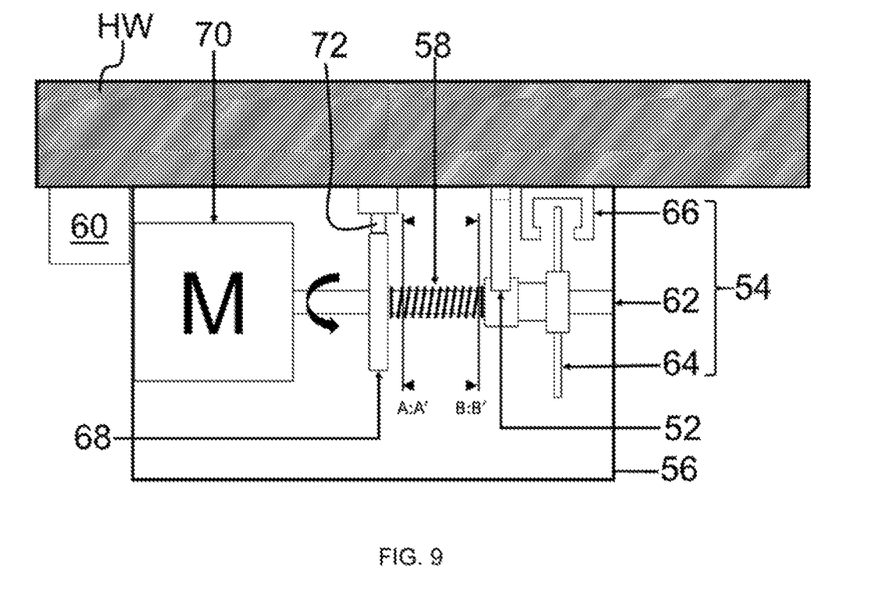
Figure 16:
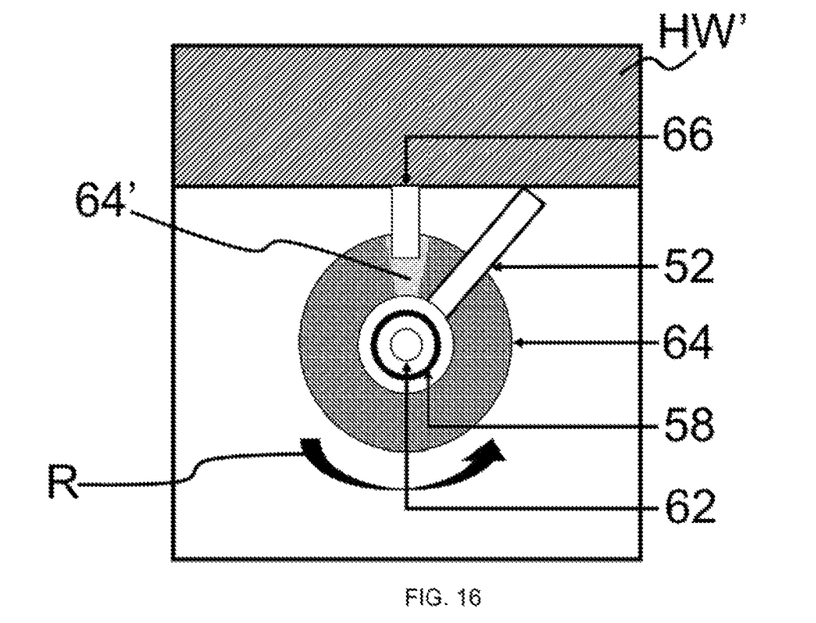

In the example, the movable contact body 52 is a latch type element which rotates on a shaft or spindle 62 to be rotated or pivoted towards and away from the hardware item HW, as illustrated by arrow R in FIGS. 9 and 16. The movable contact body 52 is coupled with the biasing device 58 which applies a force onto the contact body 52 to rotate the shaft 62 and hence the contact body 52 towards and in contact with the hardware item HW, if present. If no hardware item HW is present, the biasing force of the biasing device 58 may cause the contact body 52 to continue to rotate from a first position, shown in FIG. 9, into a second position, shown in FIG. 10 where it extends into the space previously occupied by the hardware item HW. The biasing device 58 may comprise a spring, such as a torsion or coil spring. Without being bound to the example, the biasing device 58 in the following also is referred to as a spring.

In the example, the switching unit 54 may comprise an encoder disc 64 and an associated photodetector 66, and the contact body 52 and the encoder disc 64 are arranged on the same shaft 52, to rotate in unison to transfer the rotational movement of the contact body 66 to the encoder disc 64.

The hardware detection system 50 of this example further comprises a restraining device 68 to maintain the preload on the biasing device 58, and an actuator 70 to preload the biasing device 58 to force the contact body to rotate in the first direction. The restraining device 68 may comprise an escape wheel or escapement which can assist the biasing device 58 in holding the contact body 52 against the hardware item HW. The restraining device 68 may prevent that the biasing device 58, such as a torsion spring, loses force when the actuator 70 is not operating. Without being bound to this example, the restraining device 68 in the following is referred to as escape wheel. The actuator 70, such as an electric motor, e.g. a BLDC motor, rotates the shaft 62 and, together with the shaft 62, rotates and biases the biasing device 58, such as torsion spring, and the escape wheel 68. The escape wheel 68 prevents the shaft 62 from back-rotation, i.e. it ensures that the shaft rotates in only one direction, as shown by the arrow R in FIG. 9.

The switching unit 54 may generate an output signal which is input to the control unit 60. Accordingly, the angular position of the shaft 62 and hence the angular position and operating state contact body 52 can be detected by the control unit 60.

As in the previous example, the control unit 60 can be a dedicated control unit of the hardware detection system 50 or can be part of the electromechanical equipment monitored. It also can be divided between the hardware detection system and the electromechanical equipment monitored. The control unit may be implemented in at least one of an analog or digital circuit, a logic circuit, a programmable processor, an application specific integrated circuit (ASIC), a programmable logic device (PLD) and/or a field programmable logic device (FPLD) or a combination or part thereof. The control unit may comprise software and/or firmware, including a tangible computer readable storage device or storage disk such as a memory, a digital versatile disk (DVD), a compact disk (CD), a Blu-ray disk, etc. storing the software and/or firmware.

Figure 8:
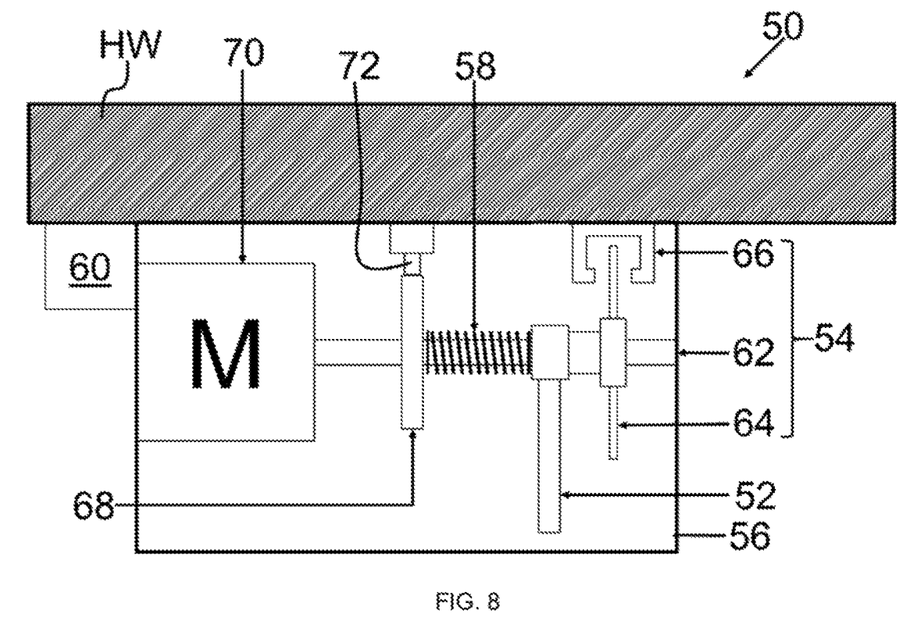
FIG. 8 to 10 show schematic diagrams of a series of states of a hardware detection system according to another example.
Figure 10:
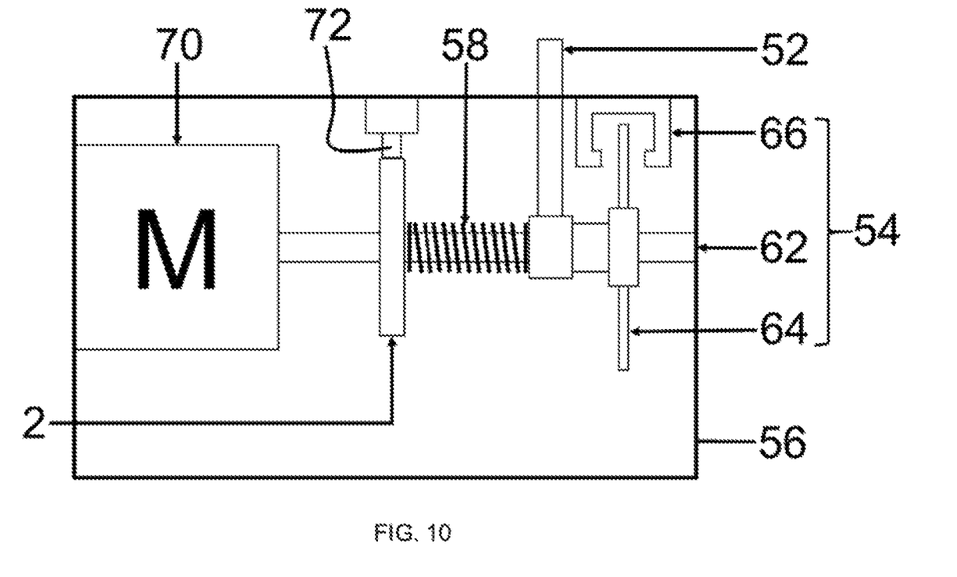
Figure 11:
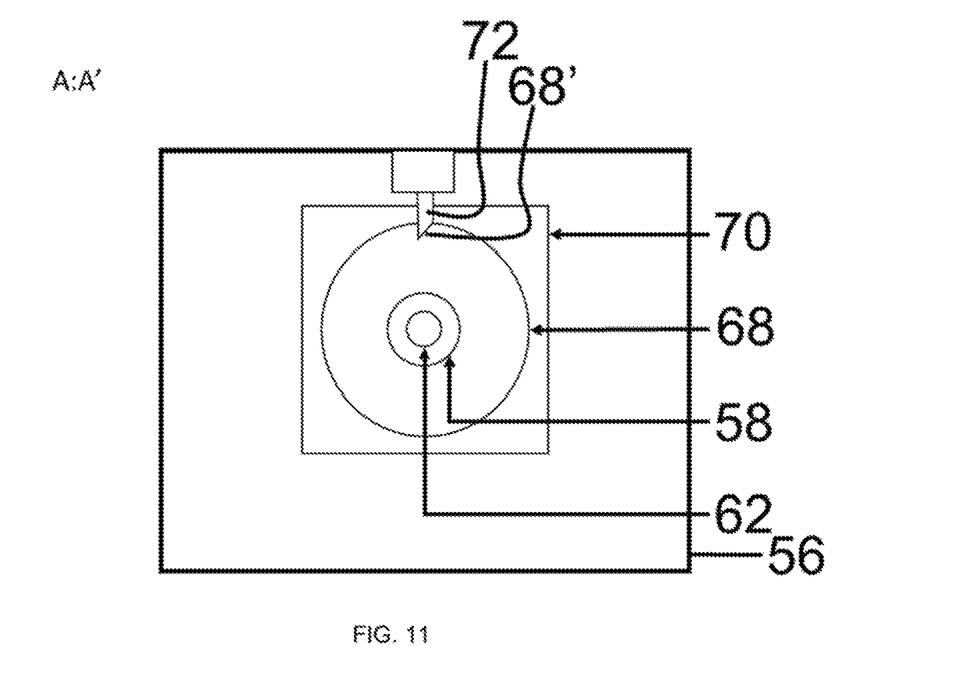
FIG. 11 shows a sectional view of the example of FIG. 8 to 10, along the line A:A' shown in FIG. 9.

FIG. 11 shows a sectional view of the example of FIG. 8 to 10, along the line A:A' shown in FIG. 9 to illustrate the functionality of the escape wheel, as an example of the restraining device 68. As illustrated in the drawing, the escape wheel 68 includes a notch 68', having a sloped surface and an opposite shoulder, interacting with an extendable pin 72, having a chamfered distal end. The pin 72 may be biased to extend towards the escape wheel 68 wherein a biasing force may be overcome by a pushing force applied by the sloped surface of the notch 68' against the chamfered distal end of the pin 72 when the escape wheel 68 rotates in a counterclockwise direction (as shown in the drawing) to push the pin 72 away from the escape wheel 68. Accordingly, if the escape wheel 68 is rotated in a first direction, counterclockwise in FIG. 11 and in the direction of arrow R in FIG. 9, the pin 72 can slide out of the notch 68' along the sloped surface thereof, the rotation pushing the pin 72 out of the notch 68', and the escape wheel 68 will be able to rotate freely in this direction. If the escape wheel 68 is rotated in the opposite direction, the pin 72 will come to rest against the shoulder within the notch 68'and will block such rotation. The escape wheel 68 may be shaped differently, with a number of recesses and/or extending teeth and the restraining device is not bound to the example shown.

FIG. 12 to 16 show sectional views of the example of FIG. 8 to 10, along the line B:B' shown in FIG. 9 to illustrate the functionality of the switching device 54, including the encoder disc 64 and the photodetector 66, and of the contact body 52.

Figure 12:
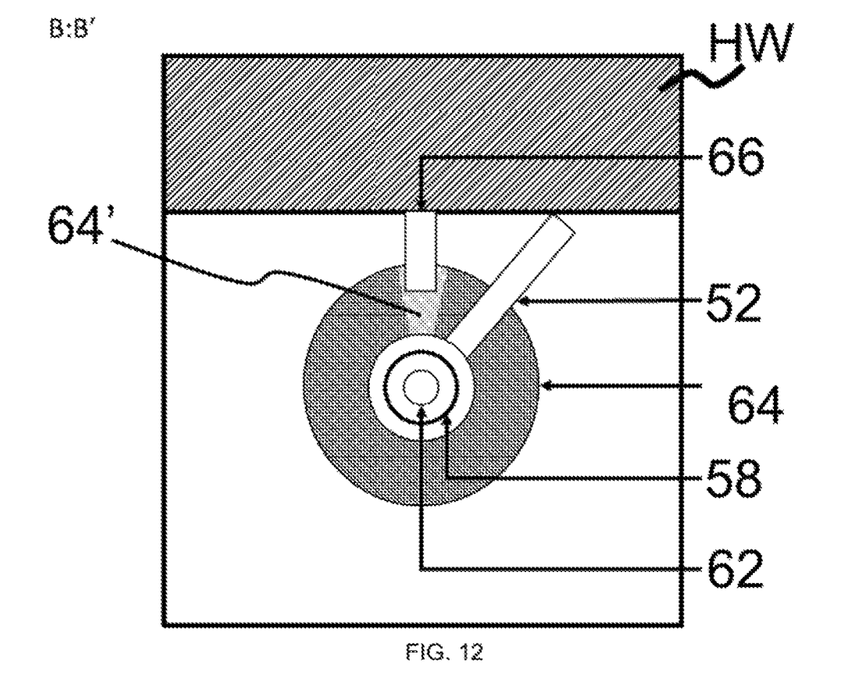
FIG. 12 to 16 show a series of sectional views of the example of FIG. 8 to 10, along the line B:B' shown in FIG. 9, illustrating a series of states of the hardware detection system according to this example.

In the following, operation of the example of the hardware detection system 50, shown in FIG. 8 to 16, is described with reference to the drawings. FIGS. 9 and 12 show an initial state of the hardware detection system 50, where a hardware item HW of an electromechanical equipment is in place, with the contact body 52 forced by biased spring 58 towards and in contact with the hardware item HW. The respective angular position of the contact body 12, shown in FIGS. 9 and 12, can be considered a first or initial position. The hardware item HW blocks the contact body 52 from any further rotation in the direction of arrow R, and the escape wheel 68 prevents any rotation in the opposite direction.

Also the switching unit 54 is in its initial position, with the encoder disc 64 and photodetector 66 generating a first signal. As shown in FIG. 12, the initial position can be one where a white zone 64', mirror zone, transparent zone, or otherwise distinct zone of the encoder disc 64 is aligned with the photodetector 66 so that the photodetector 66 generates a first detection signal which may be a YES or "1" signal indicating that the hardware item HW is present. The definition of the signal states is arbitrary and the distinct zone 64' may be e.g. lighter, more reflective or more transparent or instead be more opaque or less reflecting than the remainder of the encoder disc. The distinct zone 64' also can be distinct from the remainder of the encoder disc 64 by color, surface structure or any other characteristic which can be detected optically. Further, the first signal may instead correspond to a NO or "0" signal to indicate that the hardware item HW is present. In a further modification, the encoder disc court feature number of distinct zones to generate a multilevel signal corresponding to different angular positions of the contact body 52. Without being bound by this example, in the following description of the examples, an encoder disc 64 having a white zone 64' aligned to the photodetector 66 will be considered to generate a YES or "1" signal and to indicate an initial state of the hardware item HW, and an encoder disc 64 having a white zone 64' not aligned to the photodetector 66 will be considered to generate a NO or "0" signal and to indicate a replacement state of the hardware item HW, in which the hardware item HW has been removed and/or (re)inserted, as explained below.

If the control unit 60 detects a YES signal, the hardware detection system 50 recognizes that a hardware item HW is present and has not been replaced since a previous detection operation.

Figure 13:
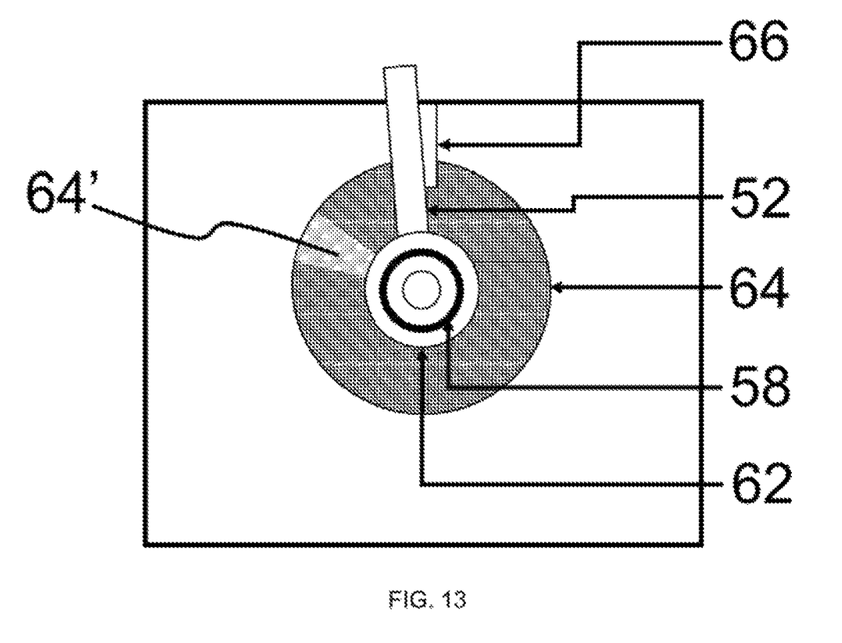

FIGS. 10 and 13 show a state in which the hardware item HW has been removed. In this state, the spring 58 has turned the shaft 62 and hence the contact body 52 from its first or initial position (shown in FIGS. 19 and 12) to a second position where the contact body 52 extends into a space previously occupied by the hardware item HW. In this second position, the white zone 64' moves out of alignment with the photodetector 66 and the photodetector will generate a signal corresponding to a NO or "0". In a modification of this example, the encoder disc 64 could be provided with a second distinct zone (not shown), different from the white zone 64' and different from the remainder of the encoder disc surface. This second distinct zone could be located on the encoder disc at a site which is aligned with the photodetector 66 when the encoder disc is in the second position, shown in FIGS. 10 and 13. With such a second distinct zone provided, instead of generating a binary signal, including YES or "1" and NO or "0" signal states, the photodetector could generate a multilevel signal, depending on the relative angular position of the encoder disc relative to the photodetector, signaling different angular positions of the contact body 52. Returning to the example shown, the state of the output signal of the photodetector 66 is changed from YES or "1" to NO or "0", when compared to the initial position of the contact body 52, indicating that the hardware item HW has been removed.

Figure 14:
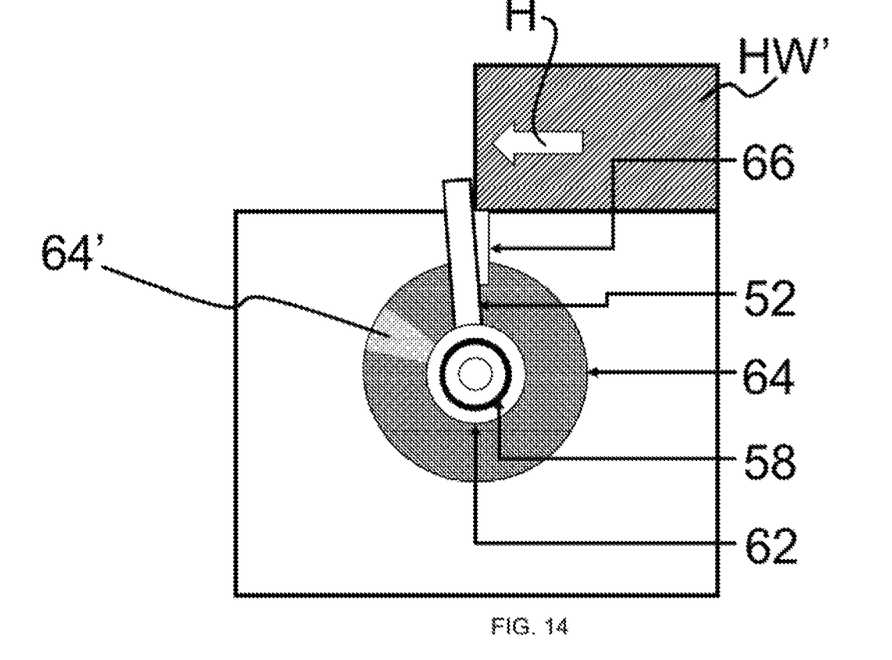
Figure 15:
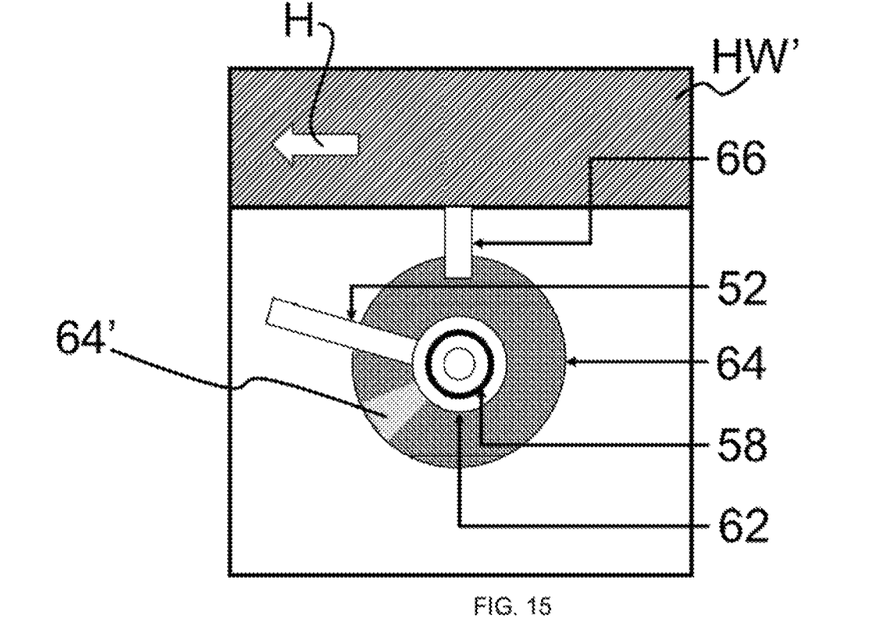

FIGS. 14 and 15 shows a situation in which the same or a different hardware item HW' is being (re)inserted. Movement of the hardware item HW' is symbolized by arrow H. In this situation, the contact body 52 is pushed to rotate further in the same direction, depicted by arrow R in FIG. 9, first by the hardware item HW' (as shown in FIG. 14), and additionally by the force applied by spring 58 (as shown in FIG. 15). The spring 58 previously may have been biased by the actuator 70 to a degree sufficient to turn the shaft 62 and hence the contact body 52 into a third position, shown in FIG. 15.

In this third position, as in the second position, the white zone 64' is out of alignment with the photodetector 66 and the photodetector will continue to generate a signal corresponding to a NO or "0". In a further modification of this example, the encoder disc 64 could be provided with third distinct zone (not shown), different from the white zone 64' and different from the remainder of the encoder disc surface. This third distinct zone could be located on the encoder disc at a site which is aligned with the photodetector 66 when the encoder disc is in the third position, shown in FIG. 15. With such a third distinct zone provided, the photodetector could generate a multilevel signal, depending on the relative angular position of the encoder disc relative to the photodetector, signaling different angular positions of the contact body 52. Returning to the example shown, the state of the output signal of the photodetector 66, when the encoder goes from the second position to the third position, remains NO or "0", indicating that the hardware item HW has been removed or the same or a new hardware item HW' has been (re)inserted.

Also in this example, the control unit 60 may be associated with the electromechanical equipment and may be powered down when the electromechanical equipment is turned off and powered up when the electromechanical equipment is turned on. Assuming that the electromechanical equipment and hence the control unit 60 is turned on during the different phases explained above with respect to FIG. 9 to 15, the control unit 60 can detect, based on the output signals of the photodetector 66, that a hardware item HW is present in the scenario FIGS. 9 and 12; and, in the scenarios shown in FIGS. 10, 13, 14, and 15, the control unit 60 can detect that the hardware item HW is removed or a new hardware item HW' is inserted.

Additionally, also in a situation where the electromechanical equipment and hence the control unit 16' is powered down and turned off for removing and replacing the hardware item, as shown in FIGS. 10, 13, 14, and 15, and, after the new hardware item has been inserted, is turned on and powered up again, as shown in FIG. 15, the control unit 60 can detect that the output signal of the photodetector 66 signals a NO or "0" and hence indicates that the hardware item HW either has been removed or replaced. Accordingly, the control unit 60 can distinguish between a situation where a hardware item was and is present and the situation where a hardware item HW had been present, and had been removed or replaced. This is possible without the use of a memory, because the decision is based on the output signal of the photodetector 66 which is different for the two situations.

Based on the scenario described with regard to FIG. 9 to 15, the control unit 60 could distinguish once between the presence of a previous hardware item HW and the removal or replacement of the previous hardware item HW. However, it could not distinguish whether the hardware item has been just removed or whether it has been replaced. Moreover, it could make such distinction just once. To enable multiple detections of the removal and reinsertion of hardware items, the control unit 60 can control the switching unit 54 to reset the detection system 50.

In the example shown in FIG. 8 to 16, upon power on of the electromechanical equipment and the control unit 60, the control unit can detect whether the photodetector 66 signals that a hardware item HW is present and has not been removed or replaced, based on receiving a YES or "1" signal according to this example, or whether the hardware item HW has been removed or replaced, based on receiving a NO or "0" signal in this example. If a NO or "0" signal is received, the control unit 60 can drive the actuator 60 to turn the shaft 62 and hence the contact body 52 until a YES or "1" signal is received from the photodetector 66. This corresponds to a situation where the white zone 64' of the encoder disc 64 is aligned with the photodetector 66, as shown in FIG. 16. This also corresponds to a situation where the contact body 52 makes contact with the (replaced) hardware item HW' if such hardware item is present.

In the example described with reference to FIG. 8 to 16, the activator 70 may continue to drive the shaft and hence the contact body 52, e.g. through one or two further full revolutions or another number or fraction of revolutions. If no hardware item is present, the contact body 52 and hence the encoder disc 64 will continue to rotate, and photodetector 66 will generate a NO or "0" signal when the white zone 64' is no longer aligned with the photodetector. This will signal to the controller 60 that no hardware item has been reinserted. The controller can issue a respective warning to a supervisor.

If, however, as shown in FIG. 16, a new hardware item HW' has been reinserted, this hardware item HW' will prevent further rotation of the contact body 52. The rotary movement of the actuator 70 still can be transferred to the spring 58 and will bias the spring to press the contact body 52 against the hardware item HW'. The detection system is back in its initial position and ready for detecting another hardware item replacement.

As explained above, replacement of hardware items can be detected even if the respective electromechanical equipment is switched off during replacement and also if the control unit 60 is powerless during the replacement. The hardware detection system can be configured such that resetting of the switching unit is under control of firmware or hardware or a combination thereof. Replacement of a hardware item can be automatically detected and logged and/or reported to a supervisor, manufacturer or servicing instance, for example. Data concerning the replacement of many different types of hardware items from different electromechanical systems can be used to identify manipulated parts to help identifying e.g. general failures or potential system improvements. The hardware replacement detection system allows an electromechanical equipment to become self-aware of hardware manipulation and can trigger user actions. Detection of replacement cannot be manipulated and can be reliably detected even when it occurs during a time where the electromechanical equipment and the control unit are off-line and powerless. Resetting commands issued by the control unit may be limited to firmware or hardware-triggered commands.

In the above examples, detection of the presence, removal and replacement of a hardware item is based on a bistable signal. Instead, also a multilevel signal or an analog signal can be used, as briefly addressed with regard to the second example.

Figure 17:
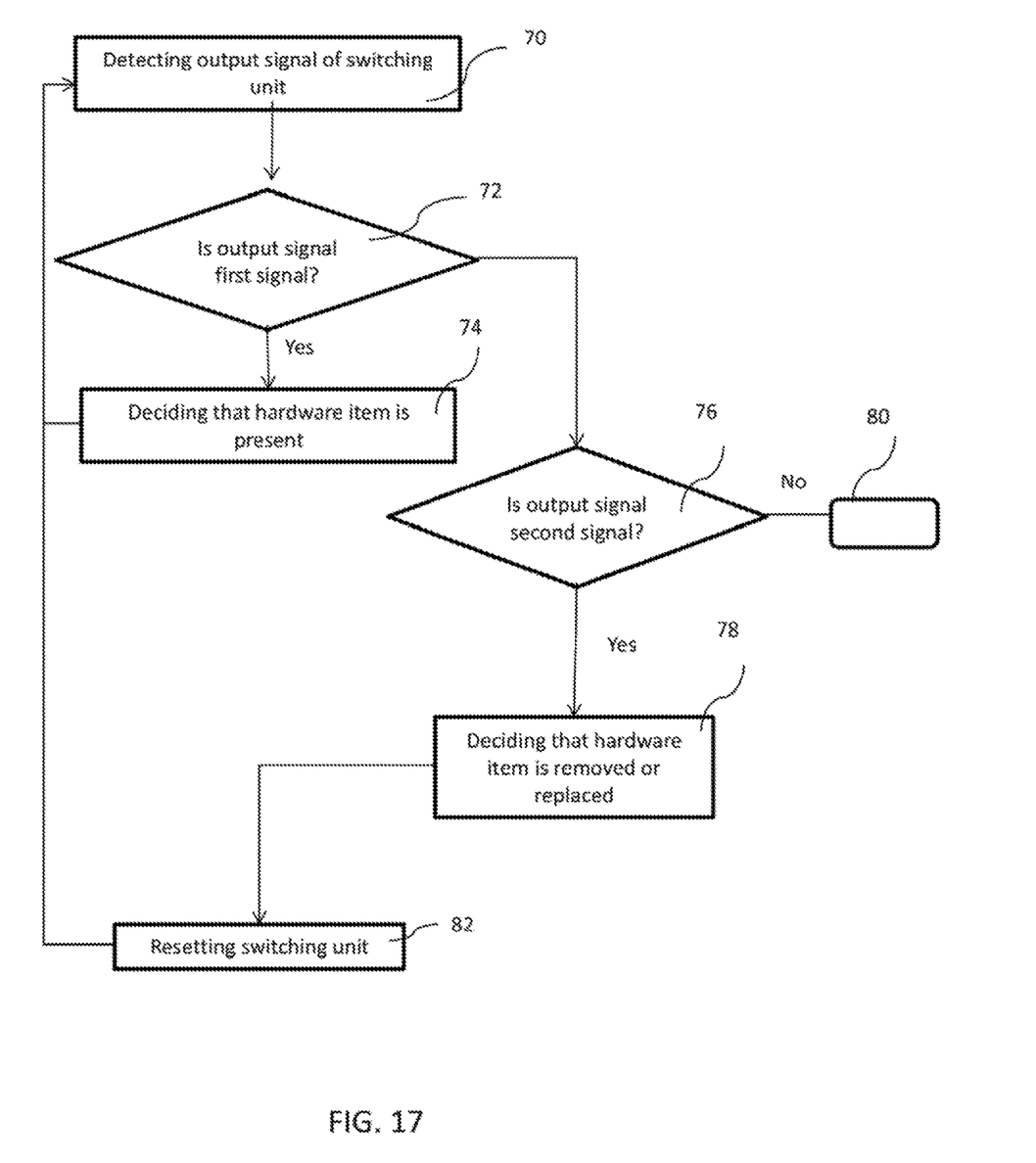
FIG. 17 shows a flow diagram of a method for detecting hardware replacement according to an example.

FIG. 17 shows a flow diagram of a method for detecting hardware replacement according to an example. The method may be performed in anyone of the systems described above or in a similar system. If reference is made to different components of an electromechanical system and/or detection system, in the description of an example of the method, these components may be any one of the components described above. For example, the switching unit may be one of the switching units described above with respect to FIG. 1 to 16, etc.

In this example, the method may start with detecting an output signal of the switching unit, at 70. At 72, it is determined whether the output signal corresponds to a first signal. If the output signal corresponds to the first signal, the method may decide that a hardware item is present and has been present since the previous detection, at 74. This means that the hardware item has not been removed or replaced since the last evaluation of the output signal. The method loops back to detecting the output signal, at 70.

Detection of the output signal may be performed in regular or irregular intervals, such as after power up of an electromechanical equipment, or it any given time intervals. If an output signal of the switching unit is detected which does not correspond to the first signal, the method determines whether the output signal corresponds to a second signal, at 76. If the output signal corresponds to a second signal, it is decided that hardware item has been removed or replaced, at 78. With reference to the first example, shown in FIG. 1 to 7, the "first signal" would correspond to the switch 24 being pushed, and the "second signal" would correspond to the switch 24 being released wherein the second signal indicates that the hardware item has been replaced. With reference to the second example, shown in FIG. 8 to 16, the "first signal" would correspond to the photodetector 66 detecting the white zone 64' of the encoder disc 64, and the "second signal" would correspond to the photodetector 66 not detecting the white zone 64' wherein the second signal indicates that the hardware item has been removed or replaced.

If the output signal of the switching unit corresponds to neither the first signal nor the second signal, this may be due to the detection system not being a binary system but a system which operates based on a multilevel signal, as he addressed above in the description of the second example. If this is the case, the output signal of the switching unit can be compared against additional signal levels to refine the decision, at 80. If the detection system is based on a binary signal level, and if the output signal corresponds to neither the first signal nor the second signal, an error might have occurred and this error can be reported e.g. to a supervisor, at 80. The box 80 hence symbolizes for the processing operations not described in detail.

After deciding that the hardware item has been removed or replaced, the method may proceed with resetting the switching unit, at 82, and then loops back to detecting the output signal, at 70. Resetting the switching unit may correspond to what has been described above with respect to FIGS. 4 and 5 or with respect to FIG. 16. Resetting the switching unit may comprise transferring the switching unit back to its initial state and further may comprise transferring the entire detection system, including the contact body 12, 52, back to its initial state.

The invention claimed is:

1. A hardware detection system, including
a moveable contact body to contact a hardware item (HW) to be detected;
a switching unit operatively coupled to the contact body;
a reset device operatively coupled to the switching unit; and
a control unit to receive a signal from the switching unit in response to a movement of the contact body and to issue a signal to the reset device in response to the signal from the switching unit.

2. The system of claim 1 wherein the switching unit comprises a switch and a switch operating device, the switch operating device coupled with the contact body so that a first movement of the contact body, from a second position to a first position, triggers a movement of the switch operating device to toggle the switch.

3. The system of claim 2 wherein the switch operating device is coupled with the contact body so that a second movement of the contact body, opposite to the first movement, does not trigger a movement of the switch operating device.

4. The system of claim 2 wherein the reset device comprises a solenoid associated with the switch operating device to reset the switch operating device to the first position.

5. The system of claim 4 wherein the contact body comprises a latch having a ramp section on a surface thereof, wherein the switch operating device is engaged with the contact body to slide along the latch surface including the ramp section when the contact body moves from the first position to the second position, without triggering a movement of the switch operating device, and wherein the latch further includes a shoulder adjacent to the ramp section, wherein the switch operating device is engaged with the shoulder, when the contact body moves from the second position to the first position, triggering a movement of the switch operating device.

6. System of claim 2, further comprising a contact body biasing device coupled with the contact body and forcing the contact body towards the second position.

7. The system of claim 6, further comprising a further biasing device coupled with the switch operating device and forcing the switch operating device towards the switch.

8. The system of claim 1 wherein the switch switching unit comprises an encoder disc and an associated photodetector, and wherein the contact body and the encoder disc are arranged on a shaft, to transfer movement of the contact body to the encoder disc.

9. The system of claim 8, further comprising a biasing device coupled with the contact body and forcing the contact body to rotate in a first direction to contact the hardware item.

10. The system of claim 9, further comprising
an actuator to preload the biasing device to force the contact body to rotate in the first direction, and
a restraining device to maintain the preload on the biasing device.

11. The system of claim 9, wherein, if a hardware item is present and the contact body contacts the hardware item, the encoder disc is in a first position and the photodetector generates a first signal; and, if no hardware item is present, the encoder disc is in a second position and the photodetector generates a second signal.

12. The system of claim 11, wherein, if a hardware item is removed and reinserted, the encoder disc is in a third position and the photodetector generates the second signal or a third signal.

13. The system of claim 8, wherein the encoder disc has different optical features arranged around the disc to indicate an amount of rotation of the disc to the photodetector, the different optical features signaling to the photodetector whether the hardware item has been removed and is absent or has been removed and replaced.

14. The system of claim 1, wherein the moveable contact body comprises a recess into which a guide pin engages when the hardware item is removed allowing a motion of the moveable contact body to align the guide pin with the recess.

15. The system of claim 14, wherein the guide pin is coupled to the switching unit such that movement of the moveable contact body when the guide pin is engaged in the recess will actuate a switch of the switching unit indicating replacement of the hardware item.

16. The system of claim 15, further comprising a solenoid with the guide pin to selectively retract the guide pin from engagement in the recess to reset the switching unit.

17. The system of claim 1, wherein the control unit is to issue a warning to a supervisor in response to movement of the moveable contact body indicating that the hardware item has been removed or replaced.

18. A method of detecting hardware replacement in an electromechanical system, the system comprising a switching unit operatively coupled to a moveable contact body that is moveable into physical contact with a hardware item, the method comprising:
   biasing the moveable contract body toward physical contact with the hardware item;
   detecting whether the switching unit outputs a first signal and deciding, based on detection of the first signal, that the moveable contact body is in physical contact with the hardware item demonstrating tha the hardware item is present in the electromechanical system since a previous signal detection;
   detecting whether the switching unit outputs a second signal based on movement of the moveable contact body and deciding, based on the second signal, that the hardware item has been removed or replaced since a previous signal detection; and
   if the second signal is detected, resetting the switching unit.

19. The method of claim 18, wherein the system further comprises a moveable contact body operatively coupled with the switching unit, the method further comprising:
   if the first hardware item is removed, causing a corresponding first movement of the contact body and, if a second hardware item is inserted, causing a respective second movement of the contact body;
   wherein the first movement or the second movement triggers the switching unit so that the switching unit generates the second signal; and
   after the second hardware item has been inserted, resetting the switching unit to generate the first signal.

20. An electromechanical equipment, including a number of replaceable hardware items, and further including
   a moveable contact body to contact one of the hardware items (HW);
   a switching unit operatively coupled to the contact body;
   a control unit to receive a signal from the switching unit in response to a movement of the contact body;
   wherein the control unit, on start up of the electromechanical equipment, detects a state of the switching unit based on the signal and determines whether hardware item has been replaced based on the detection result and, if replacement of the hardware item has been detected, issues a signal to reset the switching unit.

* * * * *